(12) United States Patent
Magner et al.

(10) Patent No.: US 8,976,014 B2
(45) Date of Patent: Mar. 10, 2015

(54) VEHICULAR SECURITY SYSTEM WITH CONFIGURABLE IMMOBILIZATION FEATURES

(75) Inventors: David S. Magner, Decorah, IA (US); Anita L. Reichling, New Hampton, IA (US)

(73) Assignee: Trimark Corporation, New Hampton, IA (US)

( * ) Notice: Subject to any disclaimer, the term of this patent is extended or adjusted under 35 U.S.C. 154(b) by 281 days.

(21) Appl. No.: 13/464,232

(22) Filed: May 4, 2012

(65) Prior Publication Data

US 2012/0280805 A1 Nov. 8, 2012

Related U.S. Application Data

(60) Provisional application No. 61/482,356, filed on May 4, 2011.

(51) Int. Cl.
| | | |
|---|---|---|
| *G06F 7/04* | (2006.01) | |
| *B60R 25/10* | (2013.01) | |
| *H04M 1/66* | (2006.01) | |
| *G07C 9/00* | (2006.01) | |
| *B60R 25/20* | (2013.01) | |

(52) U.S. Cl.
CPC ............ *G07C 9/00174* (2013.01); *B60R 25/20* (2013.01); *G07C 9/00563* (2013.01); *G07C 9/0069* (2013.01); *G07C 2009/00531* (2013.01); *B60R 2325/308* (2013.01)
USPC ...................... 340/426.11; 340/5.72; 340/5.2

(58) Field of Classification Search
CPC ........................................................ G06F 7/04
USPC ......... 340/5.72, 5.2, 5.71, 539, 426; 455/411; 701/2, 211, 29, 36
See application file for complete search history.

(56) References Cited

U.S. PATENT DOCUMENTS

| | | | |
|---|---|---|---|
| 5,963,018 A | 10/1999 | Guthrie | |
| 6,100,811 A * | 8/2000 | Hsu et al. ................... | 340/5.83 |
| 6,181,026 B1 | 1/2001 | Treharne et al. | |
| 6,392,534 B1 * | 5/2002 | Flick ........................ | 340/426.17 |

(Continued)

FOREIGN PATENT DOCUMENTS

| | | |
|---|---|---|
| GB | 2 337 137 A | 11/1999 |
| GB | 2 438 434 A | 11/2007 |

OTHER PUBLICATIONS

Body Electronics: Motoguard, "MotoMeter powered by solutions" http://www.motometer.de/motoguard-282.html (www.iveka.de), 2 pages, [retrieved from Internet on May 1, 2012].

(Continued)

*Primary Examiner* — Nam V Nguyen
(74) *Attorney, Agent, or Firm* — McKee, Voorhees & Sease

(57) ABSTRACT

A control module provides for immobilization of a vehicle. The control module includes an intelligent control disposed within a housing of the control module, a plurality of discrete inputs and a plurality of discrete outputs operatively connected to the intelligent control, at least one network interface operatively connected to the intelligent control, at least one user interface operatively connected to the intelligent control, and software stored for execution by the intelligent control, the software providing instructions to control functions of a vehicle associated with the control module, the functions including vehicle immobilization functions.

30 Claims, 9 Drawing Sheets

(56) References Cited

U.S. PATENT DOCUMENTS

| | | | |
|---|---|---|---|
| 6,549,130 B1 * | 4/2003 | Joao | 340/539.14 |
| 6,606,492 B1 * | 8/2003 | Losey | 455/411 |
| 6,696,927 B2 | 2/2004 | Flick | |
| 6,812,829 B1 * | 11/2004 | Flick | 340/426.13 |
| 6,982,626 B2 * | 1/2006 | Nedorezov | 340/5.71 |
| 7,002,449 B2 | 2/2006 | Sugawara | |
| 7,034,654 B2 | 4/2006 | Forest et al. | |
| 7,061,368 B2 | 6/2006 | Okada | |
| 7,106,171 B1 * | 9/2006 | Burgess | 340/5.72 |
| 7,188,005 B2 * | 3/2007 | Toba et al. | 701/1 |
| 7,243,007 B2 * | 7/2007 | Wilson et al. | 701/2 |
| 7,257,426 B1 * | 8/2007 | Witkowski et al. | 455/569.2 |
| 7,272,469 B2 | 9/2007 | Kalau et al. | |
| 7,327,224 B2 | 2/2008 | Parnaby | |
| 7,400,230 B2 | 7/2008 | Parnaby | |
| 7,538,655 B1 | 5/2009 | King | |
| 8,035,494 B2 | 10/2011 | Waldmann et al. | |
| 8,350,669 B2 * | 1/2013 | Magner et al. | 340/5.72 |
| 8,380,251 B2 * | 2/2013 | Witkowski et al. | 455/563 |
| 8,558,690 B2 * | 10/2013 | Kleve et al. | 340/539.11 |
| 2009/0153296 A1 * | 6/2009 | LeGasse et al. | 340/5.72 |
| 2010/0321173 A1 | 12/2010 | Magner et al. | |
| 2011/0291797 A1 | 12/2011 | Tessier et al. | |

OTHER PUBLICATIONS

Cesar "5 Star Rating for Agricultural and Construction Plant", http://www.cesarscheme.org/PDFs/RN_Plant_Security.pdf, 1 page, [retrieved from Internet on May 1, 2012].

Delphi, "Delphi Immobilizer Systems", http://delphi.com/shared/pdf/ppd/controls/imm_sys.pdf, 2008,1 page.

JCB Guardian, "What is your machine doing right now?" http://www.jcb.com/guardian/jcbguardian.aspcx, 4 pages, [retrieved from Internet on May 2, 2012].

Vapormatic, "New Product Update & Parts Information", "Vehicle Immobiliser (VLC5501) Achieves Thatcham Approval and Wins Industry Award", Jan. 22, 2010, 1 page.

* cited by examiner

VEHICULAR SECURITY SYSTEM WITH CONFIGURABLE IMMOBILIZATION FEATURES

PRIORITY STATEMENT

This application claims priority under 35 U.S.C. §119 to provisional application Ser. No. 61/482,356 filed May 4, 2011, herein incorporated by reference in its entirety.

FIELD OF THE INVENTION

The present invention relates to enhanced security for vehicles. More specifically, but not exclusively, the present invention relates to vehicle security systems with configurable immobilization features.

BACKGROUND OF THE INVENTION

Perimeter security such as door locks and security system alarms are common in many types of on-road vehicles, namely automobiles. Through additional emphasis by vehicle owners, insurance companies and law enforcement agencies, more effective theft deterrents have been implemented for on-road vehicles. Examples include: keyless entry security systems, VIN database resources, and GPS tracking technologies, such as LoJack, etc. As a result of the greater security found in on-road vehicles, other non-automotive vehicles are increasingly becoming theft targets. Examples of non-automotive vehicles may include agricultural vehicles, construction vehicles, emergency vehicles, specialty vehicles, and other types of non-automotive vehicles. These non-automotive vehicles generally have less effective theft deterrents. This fact combined with increasing vehicle values and associated accessory equipment has made theft more attractive.

In fact, construction or agricultural equipment often uses a single key code across vehicles of a particular manufacturer. This provides convenience on the job site, especially where multiple operators need access to a single machine, but provides very little security. As theft has increased with off-road equipment, initiatives supported by law enforcement and insurance industry have been implemented to try to reduce theft or vandalism of non-automotive equipment.

The Construction Equipment Security and Registration Scheme (CESAR) was devised to address certain issues regarding agricultural and construction equipment or plant. Where laws and regulations do not require items to have unique identification numbers and immobilizers security problems are present. Such equipment also may not have license plates if only used off-road. In addition, many times a common ignition key is used. Thus, theft can easily occur and recovery of stolen property is difficult because of the lack of unique identification. CESAR provides a rating systems for equipment where to receive the highest ratings equipment would need to have unique identification and an immobilization feature among other requirements.

Another problem exists with the prior art systems because of the many different vehicle platforms with various vehicle functions. This makes OEM or aftermarket security system integration difficult especially where there is existing multiplex communication architecture.

Currently immobilization systems are not configurable and as a result are costly for non-automotive vehicle manufacturers and/or may not provide ideal functionality within a particular vehicle. The cost of non-configurable immobilization systems is high due to two factors. First there is a higher engineering cost for the manufacturer to change vehicle electronics to accommodate immobilization systems. Second, cost of electronics will be higher if customized features are needed, but produced in low volume. A configurable system that accommodates existing manufacturer's electronics architecture and that can be produced in higher volumes will provide a cost benefit to manufacturers, both in integration cost and piece part costs.

Additionally current systems have limited data exchange methods. This results in limited or no data extraction, such as audit trail, diagnostics or vehicle state information. Further complexity results in security system for storing and managing authentic access codes. Often access code management results in either higher security with limited flexibility or lower security with more flexibility. Higher security is achieved when the code cannot be change at all or only with authorize personnel (dealer) through a managed access code database. Lower security is achieved with methods where no special tools or authorized personal is needed to change and manage codes.

A further problem with non-automotive vehicles is that these vehicles often have multiple points of access which makes securing these vehicles more difficult than automotive vehicles. These points of access may provide for entry, compartments, or access to specialized vehicle controls (such as hydraulic controls) which may be in areas separate from the driver's compartment. This further complicates the use of comprehensive security solutions because wiring associated with providing security features may be impractical or expensive.

For these non-automotive vehicles consideration for interior and/or exterior user interfaces is needed. With exterior user interfaces special consideration is needed, for durability and minimized visual obstruction, especially in off-road applications where environments are severe and where a requirement exists to operate sensitive equipment is present.

Note that these types of problems experienced in non-automotive vehicle are different from those associated with automotive vehicles. Immobilizers in automotive vehicles do not have the same configuration issues, the same number of access points, the same number of user interfaces, the same level of customization, or otherwise experience the same problems as non-automotive vehicles.

What is needed is an electronic access system and vehicular security system which is particularly well-suited for non-automotive vehicles, is adaptable for use in a variety of different vehicle applications, and provides security in a way that is convenient to manufacturer integrators and end-user operators.

SUMMARY OF THE INVENTION

Therefore, it is a primary object, feature, or advantage of the present invention to improve upon the state of the art.

A further object, feature, or advantage of the present invention is to provide a vehicular security system with configurable immobilization features.

A still further object, feature, or advantage of the present invention is to provide a vehicular security system with configurable immobilization features which is adaptable across manufacturer, and machine platform applications.

Another object, feature or advantage of the present invention is to provide a security system that provides multiplexing communication as well as discrete inputs and outputs.

Another object, feature or advantage of the present invention is to provide a security system that communicates via multiplexing network to enable and disable other vehicle features.

Another object, feature or advantage of the present invention is to provide a security system that disables vehicle functions via changing states of discrete outputs to control other vehicle modules or interrupt other wired circuits of the vehicle.

Another object, feature or advantage of the present invention is to provide a security system that can be used to monitor states associated with the vehicle and then execute predetermined functions.

Another object, feature or advantage of the present invention is to provide a security system that has software that is programmed to have multiple predefined function sets for various types of vehicle and applications.

Another object, feature or advantage of the present invention is to provide a security system that identifies the connected equipment and modules and customizes the system function based on equipment and modules present.

Another object, feature or advantage of the present invention is to provide a vehicle security system that uses a keypad, but also provides additional methods for operator authentication, such as transmitter fob, biometric readers, RFID devices, smart phones, or voice recognition.

Another object, feature or advantage of the present invention is to provide a vehicle security system that uses no keypad, but uses one or more methods for operator authentication, such as transmitter fob, biometric readers, RFID devices, smart phones, or voice recognition.

Yet another object, feature, or advantage of the present invention is the provision of an integrated access system that provides flexibility in the number and assignment of control outputs, and flexibility in the number and assignment of monitoring inputs without requiring redesign of the vehicle's wiring harness.

Another object, feature, or advantage of the present invention is the provision of an integrated access system that provides flexibility in the number and assignment of control outputs, and flexibility in the number and assignment of monitoring inputs without requiring redesign of the vehicle module software.

A further object, feature, or advantage of the present invention is to provide a vehicle system with modules which are configurable or re-configurable so that a single design of a module may be used for different purposes depending upon preferences of a manufacturer integrator's expectations of a particular model or type of vehicle.

A further object, feature, or advantage of the present invention is to provide a vehicle system with modules which are configurable or re-configurable so that a single design of a module may be used for different purposes depending upon preferences of an owner or operator expectations of a particular model or type of vehicle.

A further object, feature, or advantage of the present invention is to provide a vehicle access system that is expandable.

A further object, feature, or advantage of the present invention is to provide an access system that can use a network such as CAN or LIN (local interconnect network) so that OEM and third party devices may be used to provide for additional vehicle functionality.

A still further object, feature, or advantage of the present invention is to provide a system that allows for CAN or LIN control via a keypad.

Another object, feature, or advantage of the present invention is to provide a system that allows for CAN or LIN control via wireless communications receivers, such as RF, WIFI, Bluetooth, Zigbee, NFC (near field communication) or etc.

Another object, feature, or advantage of the present invention is to provide for secure compartments inside of a vehicle.

Another object, feature, or advantage of the present invention is to provide for perimeter locking and security of exterior personal or compartments doors of a vehicle.

A further object, feature, or advantage of the present invention is to provide for diagnostics and error reporting over a CAN or LIN network.

Another object, feature, or advantage of the present invention is to provide a security system which is convenient to install in the vehicle.

Another object, feature, or advantage of the present invention is to provide a security system which can install user interfaces on interior or exterior regions of vehicle.

Another object, feature, or advantage of the present invention is to provide a security system which minimizes viewing obstructions when installed on exterior surface of the vehicle like a door.

A still further object, feature, or advantage of the present invention is to provide a security system which can be implemented at a reasonable cost.

Another object, feature, or advantage of the present invention is to provide, store, and communicate user identification authentication data.

Yet another object, feature, or advantage of the present invention is to provide the ability to store and/or manipulate data either through a user interface or an electronic control module.

Another object, feature, or advantage of the present invention is to provide a common data interface port, such as USB, so that a simple standard device, such as a memory flash drive, can be used to input or extract data from module.

Another object, feature, or advantage of the present invention is to provide system recognition for component's unique identification, so that if unrecognized components are installed, system functions cannot be altered, enabled or disabled by the unrecognized components.

Yet another object, feature, or advantage of the present invention is to determine if unrecognized components are installed and if so, alter, enable, or disable system functions for security reasons.

Another object, feature, or advantage of the present invention is to provide a common data interface port that accepts data that may be encrypted so that it enables a system to transmit secured communications after user is authenticated.

Another object, feature, or advantage of the present invention is to provide a common data interface port that accepts data that may be encrypted so that it enables system to enter learn mode for system customization, such as changing access codes, enrolling other users, or adding system features.

Another object, feature, or advantage of the present invention is to provide a security system capable of securing a non-automotive vehicle in a manner which still permits convenient access and use of the vehicle to those authorized to do so.

One or more of these and/or other objects, features, or advantages of the present invention will become apparent from the specification and claims that follow. No single embodiment need exhibit each and every one of these objects, features, or advantages. The present invention contemplates that different aspects of the present may provide different objects, features, or advantages.

According to one aspect of the present invention a control module provides for immobilization of a vehicle. The control module includes an intelligent control disposed within a housing of the control module, a plurality of discrete inputs and a plurality of discrete outputs operatively connected to the intelligent control, at least one network interface operatively connected to the intelligent control, at least one user interface operatively connected to the intelligent control, and software stored for execution by the intelligent control, the software providing instructions to control functions of a vehicle associated with the control module, the functions including vehicle immobilization functions. The functions of the vehicle may also include vehicle access functions. The network interface may be a wired network interface or a wireless network interface. For example, the network interface may be a CAN network interface, a LIN network interface, a Bluetooth network interface, a NFC network interface, or a ZIGBEE network interface. The user interface may include a keypad, an RFID transponder, an RF Remote Keyless Entry, a Passive Keyless Entry, a biometric device, a smart phone or other mobile device, or a voice recognition device. The housing of the control module may be adapted to be installed at exterior locations on the vehicle to provide conformance to environmental demands and without providing visual obstructions to an operator of the vehicle. The software may further include configuration instructions, the configuration instructions used by the control module to determine identity of devices connected to the control module, functions of the devices connected to the control module, and to match functionality provided by the control module to the devices connected to the control module and the functions of the devices of the devices connected to the control module. The vehicle immobilization functions may be performed by devices connected to the control module through the discrete inputs and the discrete outputs. The vehicle immobilization functions may be performed by devices connected to the control module through the network interface.

According to another aspect of the system is the provision for immobilization of a vehicle. The system includes a control module comprising (a) an intelligent control disposed within a housing of the control module, (b) a plurality of discrete inputs and a plurality of discrete outputs operatively connected to the intelligent control, (c) at least one network interface operatively connected to the intelligent control, (d) software stored for execution by the intelligent control, the software providing instructions to control functions of the vehicle associated with the control module, the functions including vehicle immobilization functions, and (e) unique serialization of the intelligent control module for system identification and security.

The system further includes a user interface operatively connected to the intelligent control and a first device operatively connected to the control module for providing a first immobilization function. The system may further include a second device operatively connected to the control module for providing a second immobilization function and a third device operatively connected to the control module for providing a third immobilization function. The system may further include a second device operatively connected to the control module for providing vehicle access functions. Functionality of the system may be assigned as a result of connecting the system to vehicle equipment and/or modules. The software may provide for determining identity of devices operatively connected to the control module based on unique serial numbers of the devices. The software may provide for identifying if unrecognized devices are connected to the system and altering, enabling, or disabling functionality of the system where the unrecognized devices are present. The communications between the control module and the first device is encrypted to provide increased security against invalid component installation. A functionality software configuration may be assigned as a result of identifying other modules on the vehicle network. A functionality software configuration may be assigned as a result of reading discrete I/O of vehicle equipment of the vehicle. The user interface may be positioned at the door handle. The software may further include configuration instructions, the configuration instructions used by the control module to determine identity of devices connected to the control module, functions of the devices connected to the control module, and to match functionality provided by the control module to the devices connected to the control module and the functions of the devices connected to the control module.

DETAILED DESCRIPTION OF THE INVENTION

The present invention relates to enhanced security for vehicles, beyond perimeter security. More specifically, the present invention relates to deterring vehicle theft by disabling primary system functions, such as, but not limited to the ignition system, fuel pump, and other primary system functions. Personnel authentication may be provided by various methods, such as a keypad entry code, keyless entry fob transmitter, passive keyless entry fob transmitter, RFID transponder, smart phone, or biometric feature.

Figure 1A:
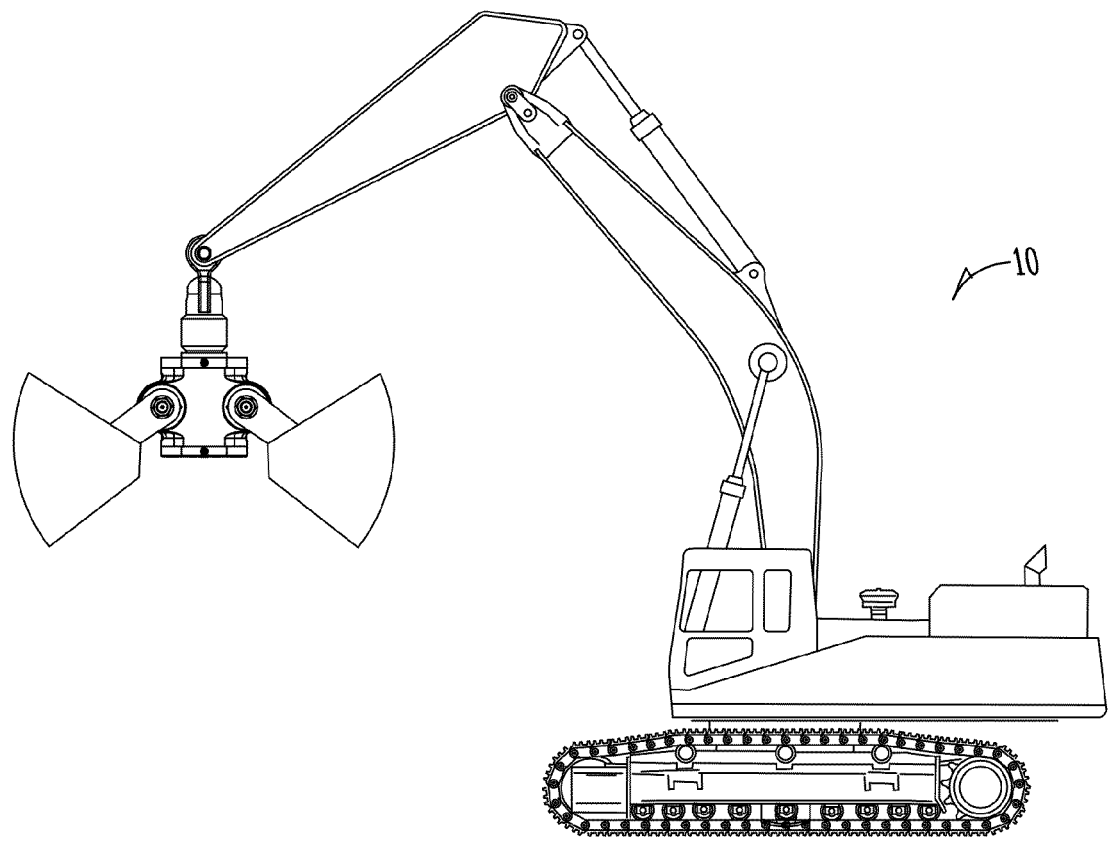
FIG. 1A is a pictorial representation of example of a vehicle equipped with the control module of the present invention.

FIG. 1A illustrates one example of a non-automotive vehicle 10. Although a particular non-automotive vehicle 10 is shown, the present invention contemplates numerous types of non-automotive vehicles may be used.

Figure 1B:
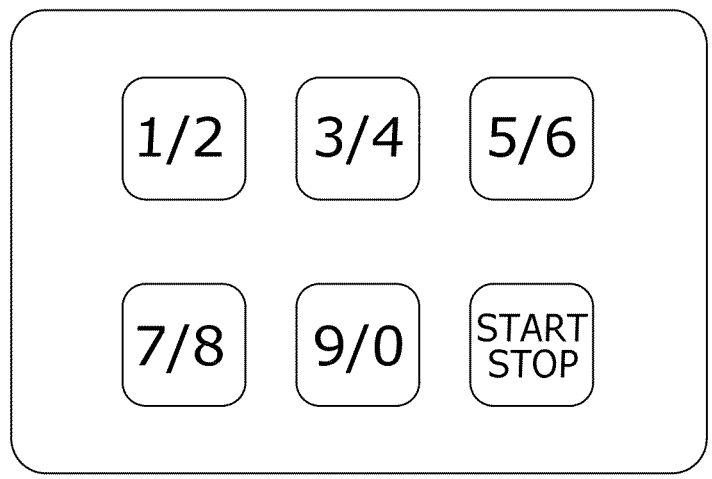
FIG. 1B is a pictorial representation of a cab interior of a vehicle.

FIG. 1B illustrates a portion of an interior of a non-automotive vehicle such as within a cab area with a keypad and other user controls present.

Figure 2:
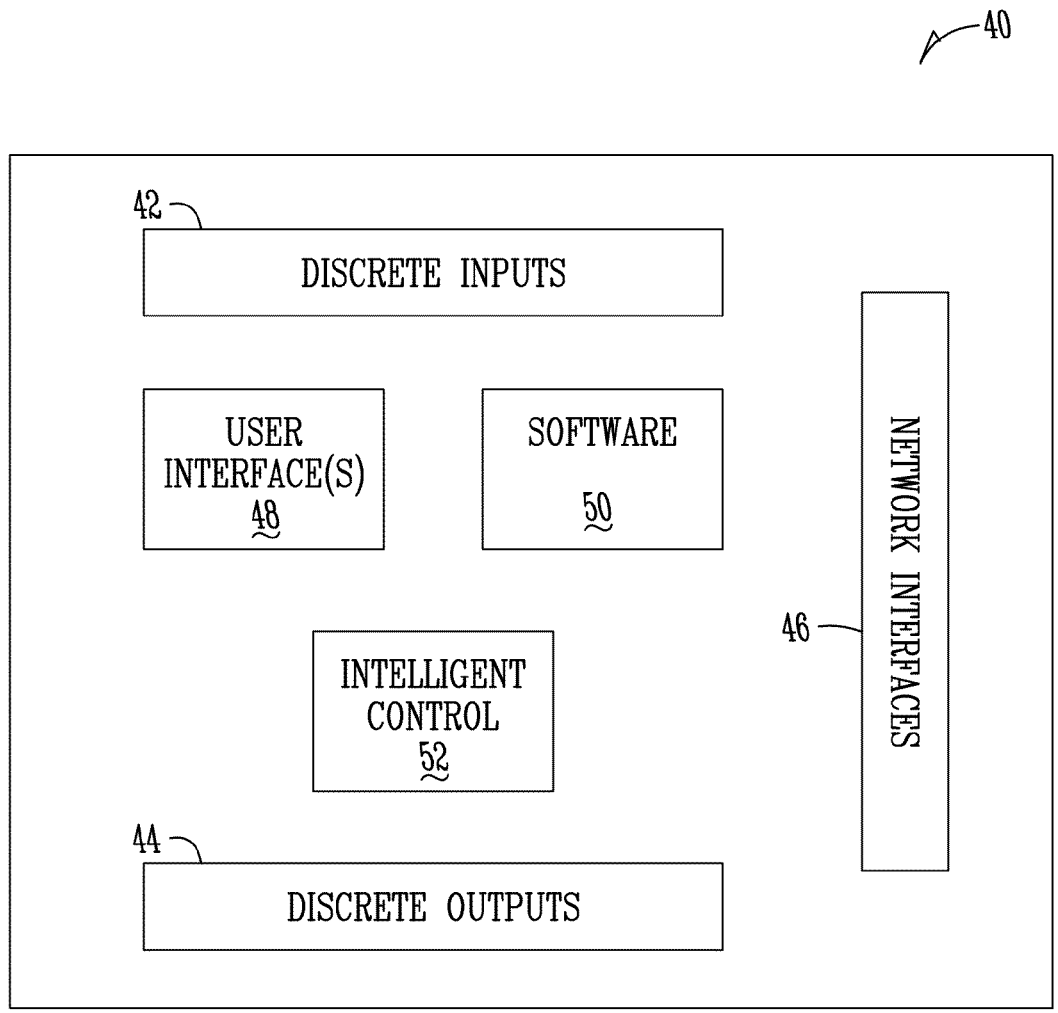
FIG. 2 is a block diagram illustrating one embodiment of the control module.

FIG. 2 illustrates one example of a control module 40 of the present invention. As shown in FIG. 2, the control module 40 has a plurality of discrete inputs 42, a plurality of discrete outputs 44, and one or more network interfaces 46. The control module 40 also includes one or more user interfaces 48 as well as software 50. The control module 40 is flexible and has the ability to adapt functionality (for example, engine immobilization) depending on the type of vehicle, the model of said vehicle, and the specific functions that are defined. The control module 40 allows for implementation across different types of electrical architecture and functions.

The discrete inputs 42 and the discrete outputs 44 provide a sufficient number of inputs and outputs for discrete monitoring of multiple user interfaces and other vehicle equipment. The discrete outputs 44 provides for control of multiple circuits such as those related to ignition, perimeter (door)

locks, fuel pump, transmission and machine functions such as hydraulics. It is to further be understood that the discrete outputs 44 may also include optional relays or other circuits within the control module 40 to provide for ease of integration into various vehicle applications. Where multiple relays are present, the control module 40 may provide for staggered outputs in order to reduce current draw. Thus, one use of the discrete inputs 42 and the discrete outputs 44 is to provide for immobilization of a vehicle by directly controlling a relay associated with the ignition, fuel pump, transmission, engine, or other device within the vehicle. Thus, the control module 40 may use discrete I/O 42, 44 to immobilize a vehicle in multiple ways without using a network interface.

The network interfaces 46 provides for vehicle communications. Thus, the control module 40 may be used in applications where common vehicle networks are present such as CAN or LIN networks and communicate with any CAN or LIN modules which may be present through the vehicle. Examples of CAN modules may include, without limitation, engine electronic control module (ECM), dash control ECM, or machine ECM. Of course other CAN or LIN modules which provide for electronic control may be present throughout the vehicle. Often the identification and communication with these modules is critical for proper security system functional control. The network interfaces 46 allow the control module to provide for immobilization of a vehicle by communicating with devices over the network. Thus, the control module 40 may immobilize a vehicle in multiple ways through using a network interface and without using discrete I/O 42, 44. Alternatively, the control module 40 may provide for immobilizing a vehicle in one or more ways by using both discrete I/O 42, 44 and network communications through the network interfaces 46. Alternatively, the control module 40 may provide for immobilizing a vehicle in one or more ways by using discrete I/O 42 independently, 44 without network communications through the network interfaces 46.

The network interfaces 46 may include wired network interfaces, wireless network interfaces, or both. Examples of wireless networks supported by the network interfaces may include RF networks, ZIGBEE networks, Bluetooth networks, Wi-Fi networks, NFC network or other types of networks. Thus, the control module 40 can access these networks and provide functions related to security as needed. Examples of wired networks may include networks such as CAN per SAE J1939 or ISOBUS 11783 and LIN per SAEJ2602 or. Of course other types of common networks may be used. It is preferred that the network includes a common multiplex network or CAN network.

The control module 40 includes software 50. The software 50 may include a plurality of instructions which are stored in a memory and execute on a processor, microcontroller, or other type of intelligent control 52. The software 50 is preferably multi-layered and uniquely serialized. Thus, upon wiring up the module 40 in a particular application and connecting the module 40 to available networks through the network interfaces(s) 46, the module 40 identifies what other components are on the network and thus the function layer that should be prescribed to the vehicle. The software 50 may also be changed when the module 40 is manufactured so as by re-programming the intelligent control 52 so that the functionality can be customized for different types of vehicles and different OEM manufacturers as is explained later herein, reprogramming can even be avoided because the module 40 can be self-learning or self-configuring. It is to be further understood that the software 50 may be stored on the intelligent control 52. Thus, for example, the intelligent control 52 may include only a single chip with the software 50 stored on that chip. The serialization of the intelligent control 52 provides additional security in the application. The serialization of control provides system recognition for component's unique identification, so that if unrecognized components are installed, system functions can be altered or disabled to prevent security from being defeated.

In addition, the software may include configuration instructions which allow the control module 40 to self-learn the configuration of a system which includes the control module 40. The configuration instructions may be used by the control module 40 to determine the identity of devices connected to the control module 40 and well as functions of the devices connected to the control module. This allows the control module 40 to match functionality provided by the control module 40 to the devices connected to the control module and the functions of the devices connected to the control module 40. This self-learning capability allows the same control module 40 to be used across different vehicles or platforms. Thus, for example, a manufacturer who manufactures different types of vehicles with different feature set could use the same control module in all of its vehicles without reprogramming the control module. Thus because upon installation other modules can be recognized, a single design of the module may work with varying arrays of vehicle architecture such as vehicles with no electronic control modules as well as vehicles with many electronic control modules. Thus, the module may be adapted to many types of vehicle platforms and many different models of vehicles within a platform.

Another feature provided by the control module 40 is that immobilization functions can be controlled using the discrete outputs 44 and the discrete inputs 42 (if necessary). Thus, even where the network interfaces 46 are not being used, immobilization functions can be controlled. In addition where the network interfaces 46 are being used, the discrete outputs 44 and the discrete inputs 42 may be used to provide redundancy or act as blocking circuits.

Figure 6:
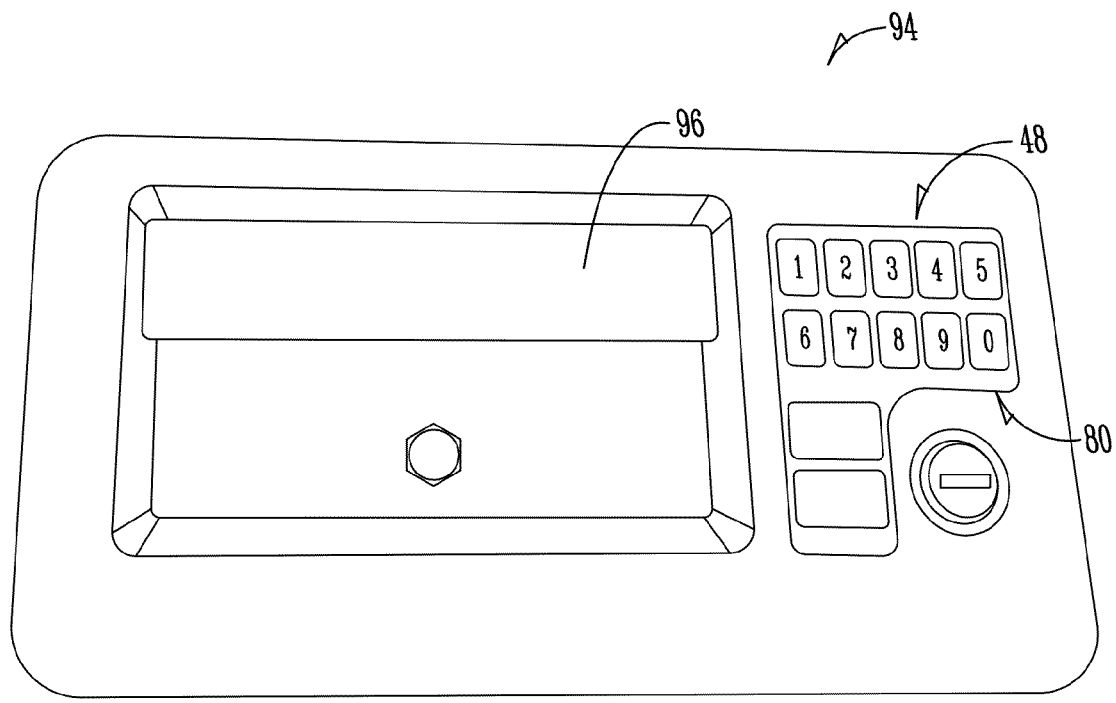
FIG. 6 illustrates one embodiment of a paddle handle with keypad.
Figure 7:
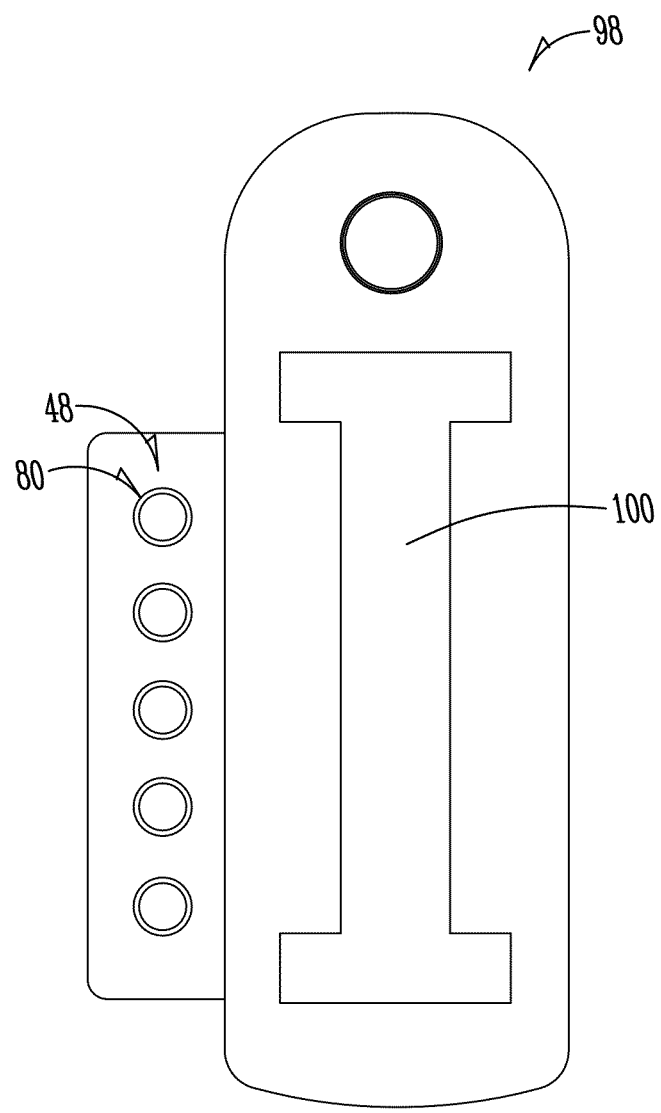
FIG. 7 illustrates one embodiment of a pull handle with keypad.

The control module 40 may also include one or more user interfaces 48. Any one or multiple ones of the user interfaces 48 may be used to properly provide for user authentication. Examples of user interfaces include, but are not limited to keypads, RFID transponders, RF remote keyless entry devices, passive keyless entry devices, smart phones, biometric devices such as finger print readers, iris readers, and voice recognition devices. It is to be understood that user interfaces may be integrated on-board a main board of the control module 40. Alternatively, portions of the user interface may be remotely located with relevant circuitry being present on the main board of the control module 40. In addition, in some applications, general purpose discrete inputs 42 or outputs 44 may connect with additional user interface devices. In other applications, user interface devices may be present on a vehicle network operatively connected to the network interface 46 of the control module 40 such as illustrated by the keypad module of FIG. 8. In other applications, a user interface may be integrated into vehicle handle modules such as shown in FIG. 6 and FIG. 7 which are discussed later herein. Because the control module 40 has both discrete I/O 42, 44 and network interface(s) 46, the same control module 40 can be used in a number of different applications in different vehicles with different configurations.

Figure 3:
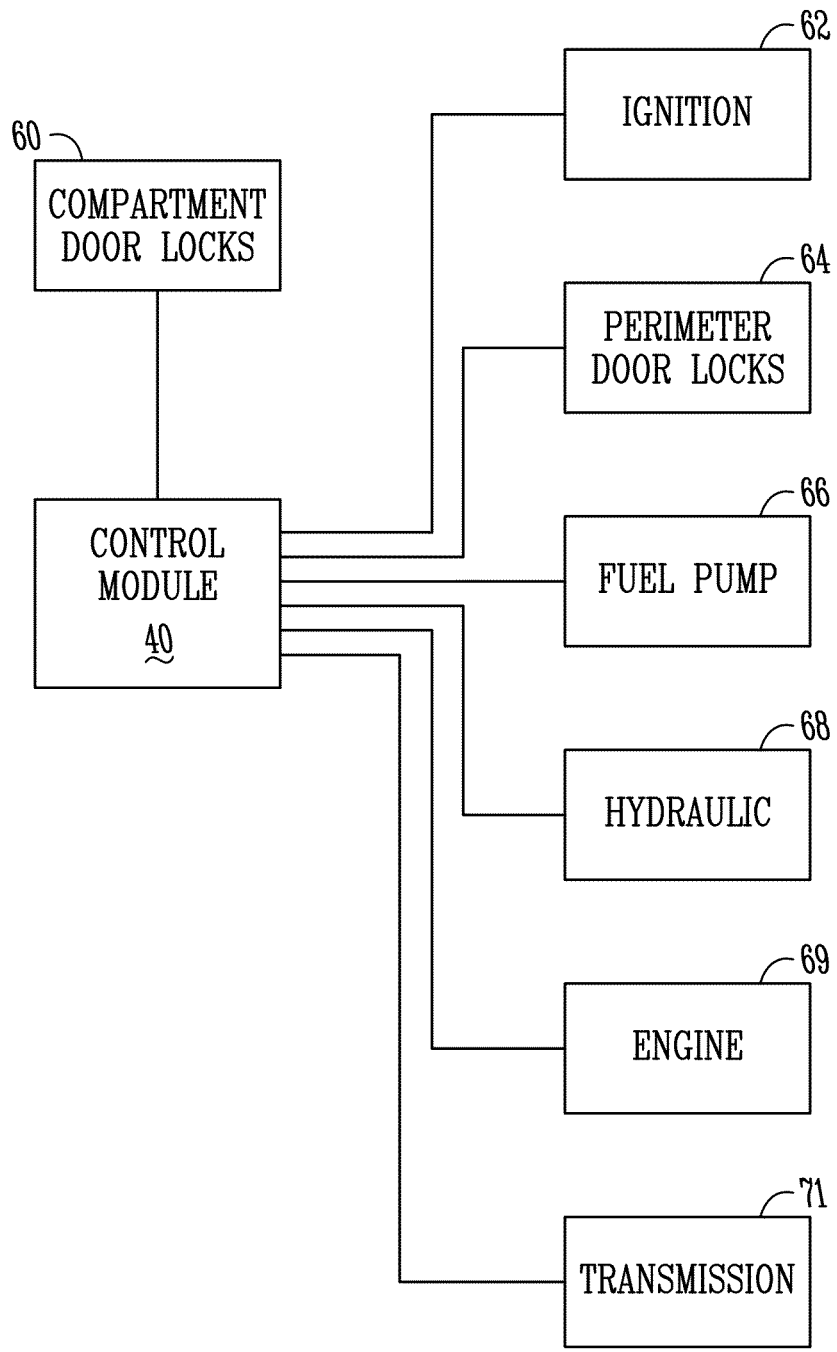
FIG. 3 is a block diagram illustrating the control module electrically connected through discrete I/O to various devices within a vehicle.

FIG. 3 illustrates the control module 40 electrically connected through discrete inputs and outputs to various components within the vehicle. Examples include compartment door locks 60, the ignition 62, perimeter door locks 64, a fuel pump 66, transmission 71, hydraulics 68, and engine off/on switch 69. The control module 40 may immobilize a vehicle in any number of ways using different devices. For example the control module 40 may immobilize a vehicle through the ignition 62, the fuel pump 66, the engine 69, and/or the transmission 71. It is to be understood that the control module 40 may be configured to immobilize a vehicle in multiple ways to provide for additional and redundant security.

Figure 4:
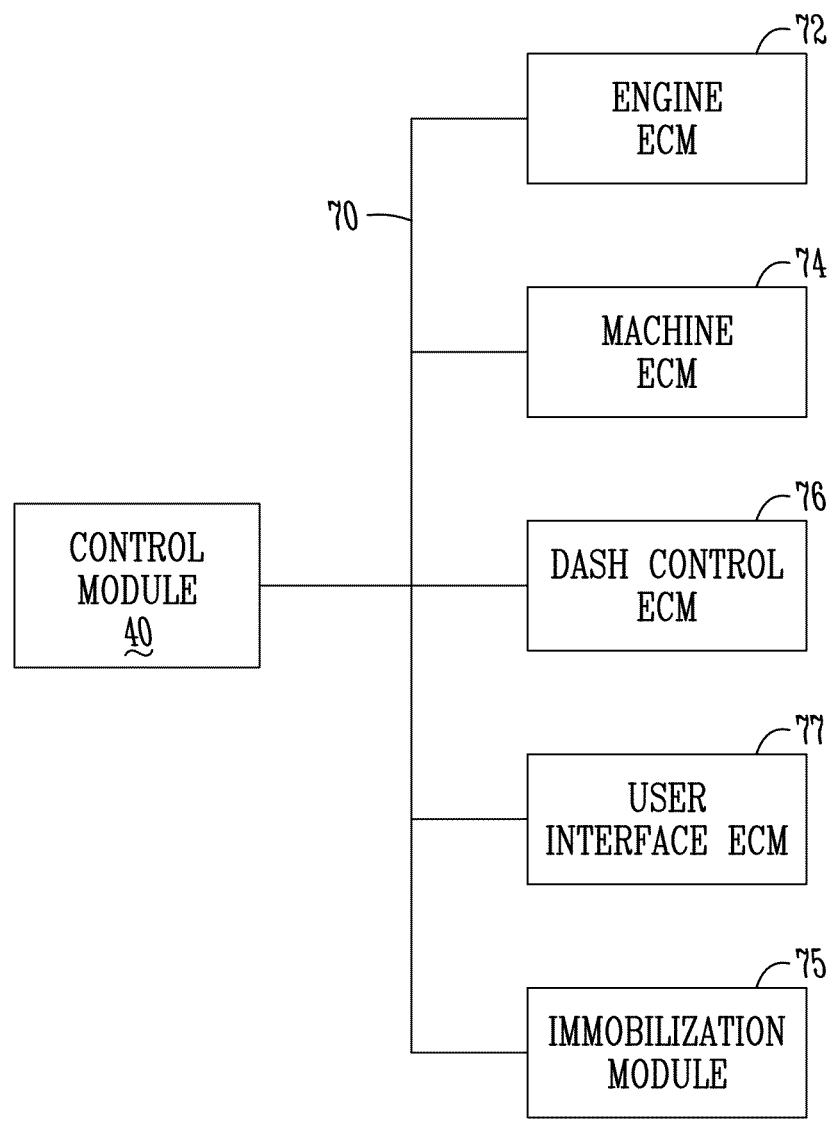
FIG. 4 is a block diagram illustrating the control module electrically connected over a CAN network to various devices within a vehicle.

FIG. 4 illustrates the control module 40 electrically connected through a CAN bus 70 to various types of devices such as an engine ECM 72, a machine ECM 74, a dash control ECM 76, a user interface ECM 77, and an immobilization module 75. Of course, the control module may be electrically connected to various other types of CAN devices as may be present in a particular vehicle configuration. Instead of a CAN network, other types of multiplex networks may be used. Note that in the example of FIG. 4, a vehicle could be immobilized in a number of different ways and by using different devices. For example, an immobilization feature or function may be provided through the engine ECM 72 as well as using the immobilization module 75.

Figure 5:
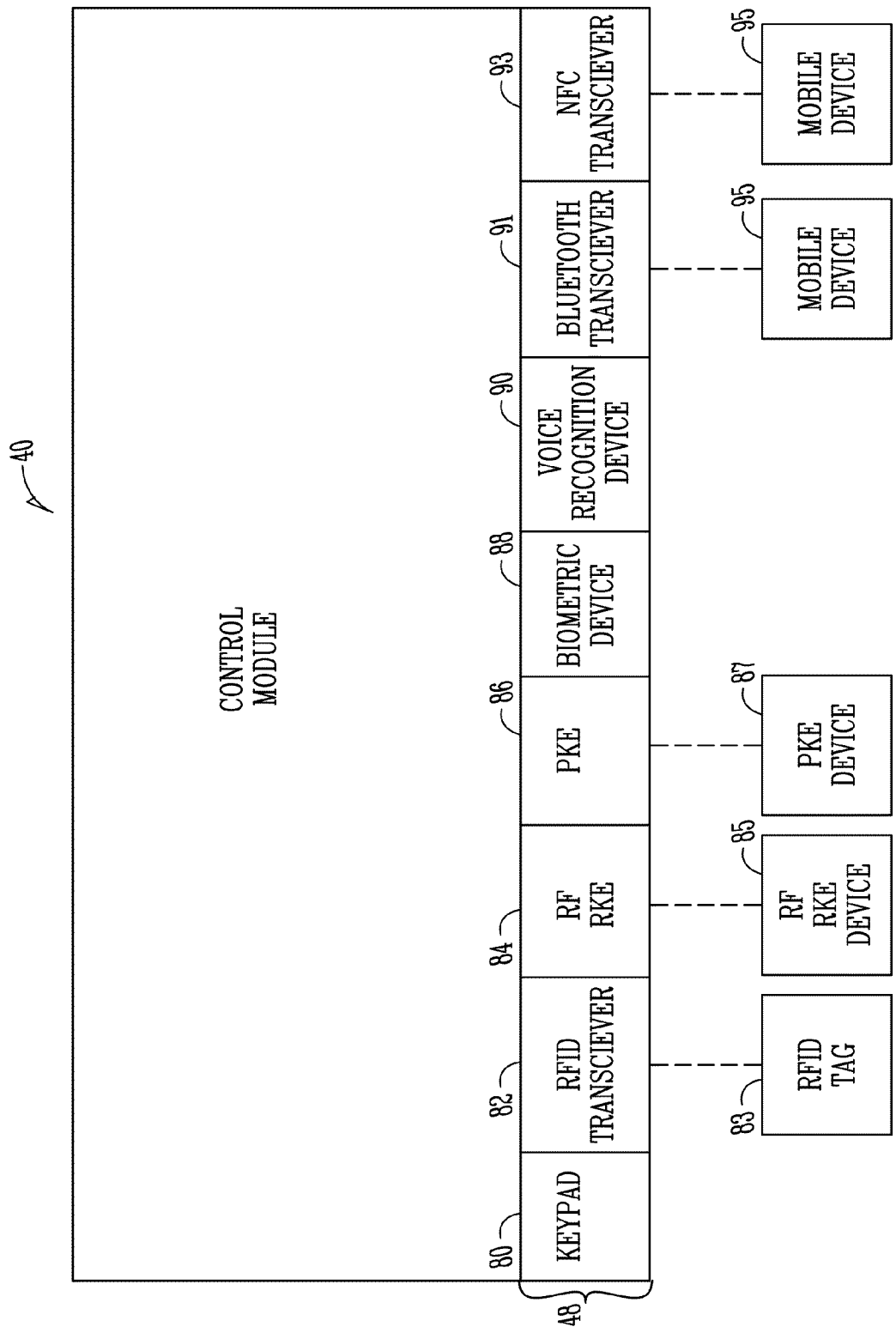
FIG. 5 is a block diagram illustrating various user interfaces which form a part of the control module 40.

FIG. 5 illustrates the control module 40 with a plurality of user interface devices 48. As shown in FIG. 5, the user interface devices may include a keypad 80, an RFID transponder 82, an RF Remote Keyless Entry (RKE) 84, a Passive Keyless entry 86, a biometric device 88, and a voice recognition device 90. An RFID tag 83 is shown which may be in operative communication with the RFID transponder 82. A RF RKE device 85 (such as may be present on a key fob) is shown in operative communication with the control module 40. A passive keyless entry (PKE) device is shown in operative communication with the control module 40

In addition, the control module 40 may include a Bluetooth or other wireless transceiver 91 which may communicate with a mobile device 95 such as a smart phone, tablet, or other device. The control module 40 may also include a NFC transceiver 93 for communicating with the mobile device 95.

FIG. 6 illustrates one embodiment of a paddle handle with keypad. Note that in FIG. 6, a door handle module 94 is provided which includes a user interface 48 which is integrated into the door handle module 94. The door handle module 94 also includes a paddle handle 96.

FIG. 7 illustrates one embodiment of a pull handle with keypad. Note that in FIG. 7, a door handle module 98 is provided which includes a user interface 48 is integrated into the door handle module 98. The door handle module 98 also includes a pull handle 100.

Figure 8:
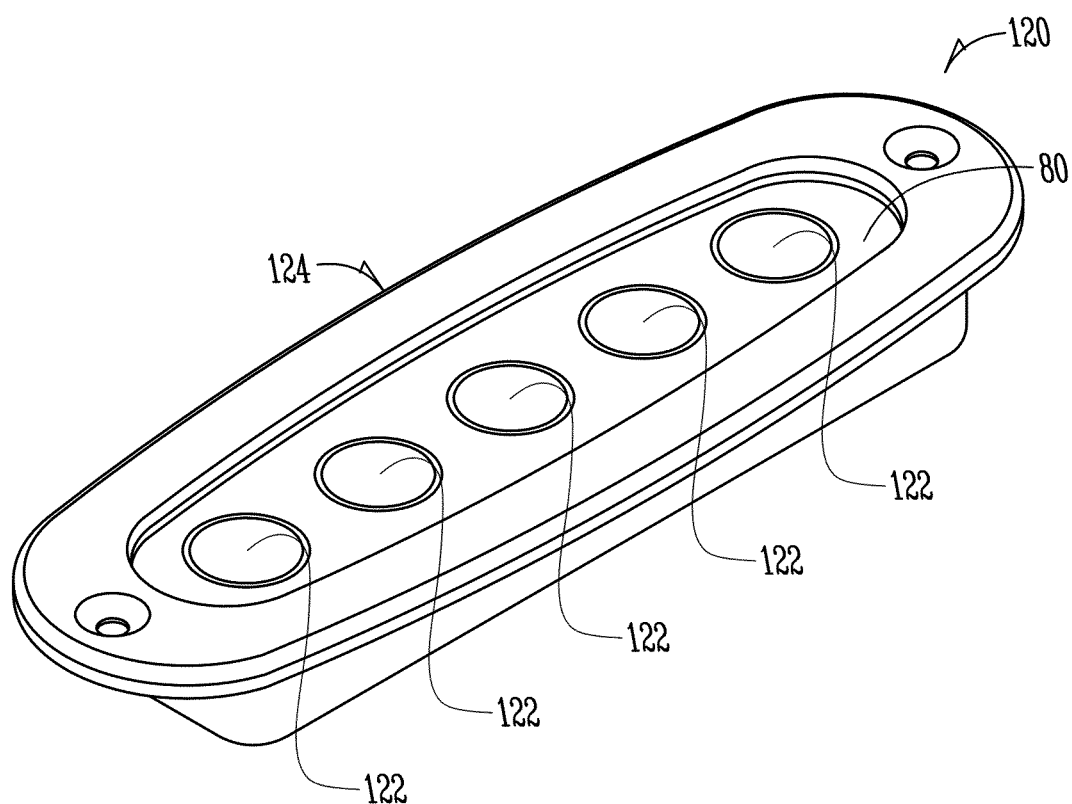
FIG. 8 illustrates one example of a keypad module.

FIG. 8 illustrates another example of a user interface in the form of a keypad module 120 which is one type of access module. The keypad module 120 includes a housing 124 with a key pad 80 which includes buttons 122. The keypad module may include a network interface and communicate with the control module through the network interface. Thus, the present invention allows user interfaces to be connected to the control module through discrete I/O or through network interfaces or otherwise. Thus, an electronic system with immobilization devices has been disclosed. The present invention contemplates numerous variations in the particular vehicle functions provided, variations in the specific inputs and outputs provided, the communication between controller modules, the number and type of access modules, how the modules are configured, and the types of vehicle used. These and other variations are well within the spirit and scope of the invention.

What is claimed is:

1. A control module for providing immobilization of a vehicle, comprising:
   an intelligent control disposed within a housing of the control module;
   a plurality of discrete inputs and a plurality of discrete outputs operatively connected to the intelligent control;
   at least one network interface operatively connected to the intelligent control;
   at least one user interface operatively connected to the intelligent control, wherein a first user interface of the at least one user interface comprises a keypad;
   software stored for execution by the intelligent control, the software providing instructions to control functions of a vehicle associated with the control module, the functions including a plurality of vehicle immobilization functions selected from a set consisting of a vehicle ignition immobilization function, a fuel pump vehicle immobilization function, a vehicle transmission immobilization function, a vehicle engine immobilization function, a vehicle hydraulics immobilization function, and a vehicle pneumatics immobilization function;
   wherein the software is configurable for immobilizing the vehicle using a plurality of the vehicle immobilization functions.

2. The control module of claim 1 wherein the network interface is a wired network interface.

3. The control module of claim 1 wherein the network interface is a wireless network interface.

4. The control module of claim 1 wherein the network interface is selected from a set consisting of a controller area network (CAN) network interface, a local interconnect network (LIN) network interface, a Bluetooth network interface, a near field communication (NFC) network interface, and a ZigBee network interface.

5. The control module of claim 1 wherein the at least one user interface further comprises a second interface selected from a set consisting of an RFID transponder, an RF Remote Keyless Entry, a Passive Keyless Entry, a biometric device, a smart phone, and a voice recognition device.

6. The control module of claim 5 wherein the control module is configured to use the second user interface in performing personnel authentication.

7. The control module of claim 1 wherein the housing is adapted to be installed at exterior locations on the vehicle to provide conformance to environmental demands and without providing visual obstructions to an operator of the vehicle.

8. The control module of claim 1 wherein the software further includes configuration instructions, the configuration instructions used by the control module to determine identity of devices connected to the control module, functions of the devices connected to the control module, and to match functionality provided by the control module to the devices connected to the control module and the functions of the devices connected to the control module.

9. The control module of claim 1 wherein the vehicle immobilization functions are performed by devices connected to the control module through the discrete inputs and the discrete outputs.

10. The control module of claim 1 wherein the vehicle immobilization functions are performed by devices connected to the control module through the network interface.

11. The control module of claim 1 wherein the control module is configured to use the keypad in performing personnel authentication.

12. A system for providing immobilization of a vehicle, the system comprising:
    a control module comprising (a) an intelligent control disposed within a housing of the control module, (b) a plurality of discrete inputs and a plurality of discrete outputs operatively connected to the intelligent control, (c) at least one network interface operatively connected to the intelligent control, and (d) software stored for execution by the intelligent control, the software providing instructions to control functions of the vehicle associated with the control module, the functions including a plurality of vehicle immobilization functions, and (e) unique serialization of the intelligent control module for system identification and security;

a user interface operatively connected to the intelligent control;

wherein the control module is configured to control a first vehicle subsystem operatively connected to the control module for providing a first immobilization function selected from a set consisting of a vehicle ignition immobilization function, a fuel pump vehicle immobilization function, a vehicle transmission immobilization function, a vehicle engine immobilization function, a vehicle hydraulics immobilization function, and a vehicle pneumatics immobilization function.

13. The system of claim 12 wherein the control module is configured to control a second vehicle subsystem operatively connected to the control module for providing a second immobilization function selected from the set consisting of a vehicle ignition immobilization function, a fuel pump vehicle immobilization function, a vehicle transmission immobilization function, a vehicle engine immobilization function, a vehicle hydraulics immobilization function, and a vehicle pneumatics immobilization function.

14. The system of claim 13 wherein the control module is configured to control a third vehicle subsystem operatively connected to the control module for providing a third immobilization function selected from the set consisting of a vehicle ignition immobilization function, a fuel pump vehicle immobilization function, a vehicle transmission immobilization function, a vehicle engine immobilization function, a vehicle hydraulics immobilization function, and a vehicle pneumatics immobilization function.

15. The system of claim 14 wherein the third vehicle subsystem is operatively connected to the control module through the network interface.

16. The system of claim 13 further comprising a vehicle access control device operatively connected to the control module for providing vehicle access functions.

17. The system of claim 16 wherein the vehicle access control device comprises an actuator associated with a door lock.

18. The system of claim 16 wherein functionality is assigned as a result of connecting the system to vehicle equipment and/or modules.

19. The system of claim 16 wherein the software provides for determining identity of devices operatively connected to the control module based on unique serial numbers of the devices.

20. The system of claim 19 wherein the software further provides for identifying if unrecognized devices are connected to the system and altering, enabling, or disabling functionality of the system where the unrecognized devices are present.

21. The system of claim 19 wherein a functionality software configuration is assigned as a result of identifying other modules on the vehicle network.

22. The system of previous claim 19 wherein a functionality software configuration is assigned as a result of reading discrete I/O of vehicle equipment of the vehicle.

23. The system of claim 16 wherein communications between the control module and the first device is encrypted to provide increased security against invalid component installation.

24. A vehicle comprising the system of claim 13.

25. The system of claim 12 further comprising a door handle, wherein the user interface is positioned at the door handle, the user interface comprising a keypad.

26. The system of claim 25 wherein the door handle is a pull handle.

27. The system of claim 25 wherein the door handle is a paddle handle.

28. The system of claim 13 wherein at least a subset of the plurality of discrete inputs and a plurality of discrete outputs are electrically connected to the second device.

29. The system of claim 13 wherein the second vehicle subsystem is operatively connected to the control module through the network interface.

30. The system of claim 12 wherein the software further includes configuration instructions, the configuration instructions used by the control module to determine identity of devices connected to the control module, functions of the devices connected to the control module, and to match functionality provided by the control module to the devices connected to the control module and the functions of the devices connected to the control module.

* * * * *

UNITED STATES PATENT AND TRADEMARK OFFICE
CERTIFICATE OF CORRECTION

| | | |
|---|---|---|
| PATENT NO. | : 8,976,014 B2 | Page 1 of 1 |
| APPLICATION NO. | : 13/464232 | |
| DATED | : March 10, 2015 | |
| INVENTOR(S) | : David S. Magner et al. | |

It is certified that error appears in the above-identified patent and that said Letters Patent is hereby corrected as shown below:

In the Claims

Col. 10, Claim 1, Line 16:
DELETE after immobilization "function ,"
ADD after immobilization --function,--

Col. 12, Claim 24, Line 23:
DELETE after claim "13,"
ADD after claim --13.--

Signed and Sealed this
Ninth Day of June, 2015

Michelle K. Lee
*Director of the United States Patent and Trademark Office*